United States Patent
Kast et al.

(10) Patent No.: US 6,846,956 B2
(45) Date of Patent: Jan. 25, 2005

(54) TRIARYLMETHANE DYES

(75) Inventors: Hellmut Kast, Bobenheim-Roxheim (DE); Thomas Gessner, Heidelberg (DE); Rainer Tresch, Maxdorf (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 92 days.

(21) Appl. No.: 10/344,407

(22) PCT Filed: Aug. 14, 2001

(86) PCT No.: PCT/EP01/09396
§ 371 (c)(1),
(2), (4) Date: Feb. 14, 2003

(87) PCT Pub. No.: WO02/14436
PCT Pub. Date: Feb. 21, 2002

(65) Prior Publication Data
US 2003/0181740 A1 Sep. 25, 2003

(30) Foreign Application Priority Data
Aug. 14, 2000 (DE) .......................... 100 39 701

(51) Int. Cl.[7] .......................... C09B 11/18; C09D 11/00
(52) U.S. Cl. .................. 564/321; 564/327; 564/331; 564/332; 564/333; 106/31.13; 101/336; 8/919
(58) Field of Search .................. 564/321, 327, 564/331–333

(56) References Cited

U.S. PATENT DOCUMENTS 3,828,071 A * 8/1974 Kast et al. .................. 548/511
5,347,022 A * 9/1994 Gessner et al. ............. 552/113
5,792,879 A * 8/1998 Gessner et al. ............. 552/108

FOREIGN PATENT DOCUMENTS

| DE | 741 008 | 11/1943 |
|----|---------|---------|
| DE | 2729918 | 1/1979 |
| DE | 3301822 | 8/1983 |
| EP | 0 564 930 | 10/1993 |
| EP | 0 568 806 | 11/1993 |
| FR | 1 406 247 | 7/1965 |

OTHER PUBLICATIONS

Database CAPLUS on STN, Acc. No. 1983:577495, NIWA et al., DE 3301822 (Aug. 4, 1983), (abstract).*
Database CAPLUS on STN, Acc. No. 1979:151783, Schmeidl et al., DE 2729918 (Jan. 18, 1979), (abstract).*

* cited by examiner

*Primary Examiner*—Brian J. Davis
(74) *Attorney, Agent, or Firm*—Oblon, Spivak, McClelland, Maier & Neustadt, P.C.

(57) ABSTRACT

Described is a triarylmethane dye of the formula I where $R^1$ and $R^2$ are independently methyl, ethyl or hydroxyethyl, Q is substituted or unsubstituited phenyl or naphthyl and $A^\ominus$ is the equivalent of an anion. It does not detach carcinogenic Michler's ketone.

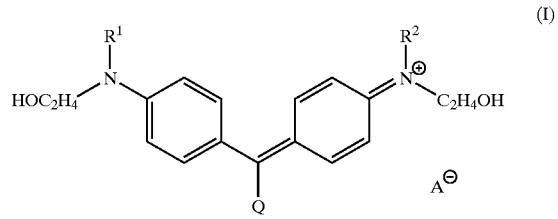

27 Claims, No Drawings

TRIARYLMETHANE DYES

This application is a 371 of PCT/EP01/09396 filed Aug. 14, 2001.

The present invention relates to triarylmethane dyes, to a process for preparing them, to an intermediate and also to the use of the triarylmethane dyes.

Triarylmethane dyes are widely used for producing paper dyes, printing inks, ballpoint pen pastes, etc. The term "Victoria blue" designates a group of cationic triarylmethane dyes which contain an alkylamino- and/or arylamino-substituted naphthyl radical and are used for producing lightfast brilliant blue pigments and for dyeing paper fiber. Victoria blue dyes have the following structure:

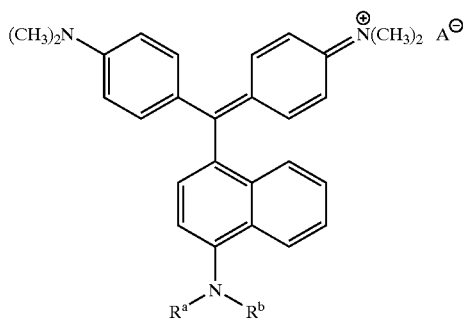

where $R^a$ is methyl, ethyl or phenyl, $R^b$ is hydrogen or methyl and $A^\ominus$ is the equivalent of an anion.

Preparations of Victoria blue dyes may include traces of Michler's ketone with the hereinbelow shown formula

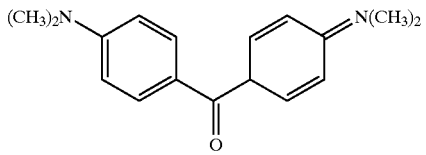

in particular from the synthesis or because of hydrolysis in the course of storage, especially at high temperatures.

Recent studies have shown that Michler's ketone is toxicologically unsafe and has carcinogenic properties in particular. There is therefore a need for triarylmethane dyes where there is no danger of contamination with Michler's ketone in the course of their synthesis and which do not detach Michler's ketone in the course of storage, even under conditions of elevated temperature and humidity.

WO 92/04416 proposes by way of a solution to this problem replacing at least one methyl group of the dimethylaminophenyl radical with another alkyl group or with an aralkyl or aryl group, for example with ethyl groups. It has been determined that although the triarylmethane dyes obtained in this way have satisfactory dyeing properties, the solubility properties of the dyes are substantially altered by the replacement of the methyl group. This is disadvantageous in that the dyes proposed in WO 92/04416 cannot be used in printing inks, ballpoint pen pastes and for dyeing paper fiber instead of Victoria blue or other previously used triarylmethane dyes without major modifications to established formulations.

It is an object of the present invention to provide triarylmethane dyes where Michler's ketone is not by-produced in the course of their synthesis and/or which do not detach Michler's ketone in the course of storage, especially at elevated temperature and humidity, and whose application properties, for example solubility properties, are essentially equivalent to those of the corresponding, dimethylaminophenyl-containing dyes.

We have found that this object is achieved according to the invention by triarylmethane dyes of the formula I or II

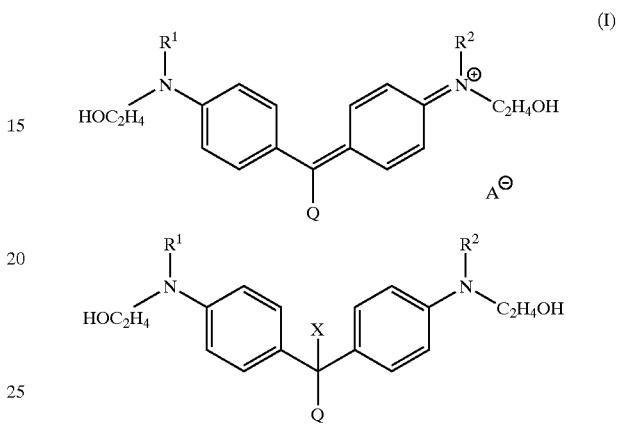

where $R^1$ and $R^2$ are independently methyl, ethyl or hydroxyethyl,

Q is phenyl or naphthyl which each may bear one or two substituents selected from the group consisting of methyl, chlorine, amino, methylamino, ethylamino, dimethylamino, diethylamino, N-ethyl-N-methylamino, N-methyl-N-phenylamino, N-ethyl-N-phenylamino, phenylamino, diphenylamino, hydroxyl, methoxy and hydroxysulfonyl;

$A^\ominus$ is the equivalent of an anion, and

X is hydroxyl or amino.

Q is preferably a radical of the formula III or IV

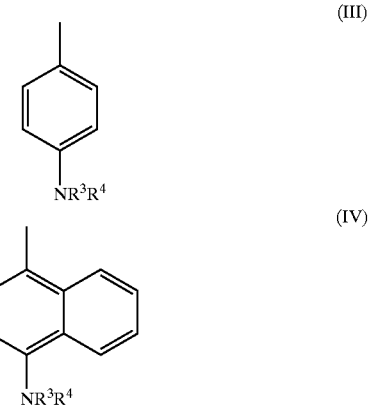

where $R^3$ and $R^4$ are independently hydrogen, methyl, ethyl or phenyl.

Particularly preferably Q is a radical of the formula V

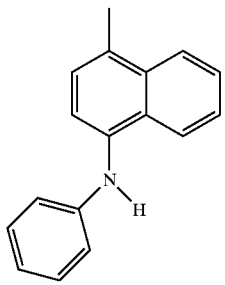
(V)

In most cases it is preferable for $R^1$ and $R^2$ to be identical.

$A^\ominus$ is the equivalent of an anion of an inorganic or organic acid. Examples are halide, for example chloride or bromide; sulfate, phosphate, carboxylate, for example formate, acetate, lactate, laurate, myristate, palmitate, stearate, adipate, oleate, benzoate, phthalate, isophthalate, terephthalate, naphthoate; alkyl-, aryl- or alkylaryl sulfonate, such as methanesulfonate, dodecylbenzenesulfonate; the anion of mono- and dialkyl esters of phosphoric acid or the anion of N-oleylsarcosine.

The triarylmethane dyes of the formula I are convertible in a conventional manner into lakes, in which case X mostly represents the anion of a complex inorganic acid, such as phosphomolybdic acid or phosphotungstic acid.

Triarylmethane dyes of the formula I can be prepared in various ways, for example by oxidizing a leuco compound of the formula Ia

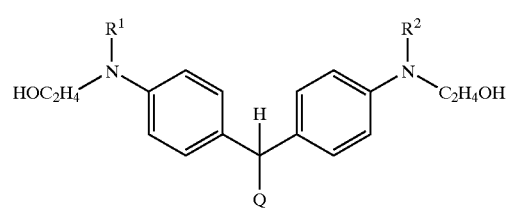
(Ia)

with an oxidizing agent in the presence of an anion source. Useful oxidizing agents include for example inorganic oxidizing agents containing a heavy metal, such as manganese (IV) oxide or dichromates, and also chloranil. Preferred oxidizing agents further include hydrogen peroxide, hydrogen peroxide donor compounds, organic hydroperoxides and percarboxylic acids, although these are preferably used with an oxygen transfer catalyst from the class of the porphyrins, tetraaza[14]annulenes, naphthalocyanines or tetraazacyclotetradecanes (cf. EP-A-0 568 806). A further preferred oxidizing agent is molecular oxygen, in which case the hereinbelow indicated oxygen-activating heavy metal catalysts, especially iron and/or cobalt catalysts, and redox mediators are generally used as well.

Alternatively, triarylmethane dyes of the formula I are obtainable by reacting a dyebase of the formula II with an acid HA.

Triarylmethane dyes of the formula I where Q is a radical of the formula III or IV are preferably obtained by a process that comprises reacting an N-hydroxyethylaniline of the formula VI

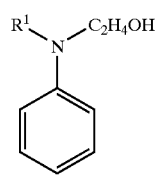
(VI)

with formaldehyde to form a 4,4'-bis(hydroxyethylamino) diphenylmethane of the formula VII

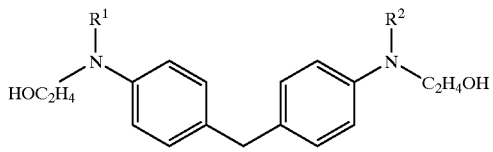
(VII)

and treating the 4,4'-bis(hydroxyethylamino) diphenylmethane VII with an oxidizing agent in the presence of an aminoaromatic of the formula VIII or IX

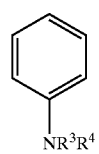
(VIII)

(IX)

and of an anion source to obtain a triarylmethane dye of the formula I which is optionally converted with an alkali metal hydroxide or ammonia into a triarylmethane dye of the formula II. The radicals $R^1$, $R^2$, $R^3$ and $R^4$ in the formulae VI to IX are each as previously defined.

Formaldehyde is conveniently used in a commercially available oligomeric form, such as metaformaldehyde or paraformaldehyde, or as aqueous solution. The reaction of the N-hydroxyethylaniline of the formula VI with formaldehyde is conveniently effected in a suitable solvent, such as acetic acid, methanol, ethanol, ethylene glycol, 1,2-propanediol, chloroform, toluene, formic acid, tetrahydrofuran, dioxane, n-butyl ether, methyl benzoate, ethylene glycol methyl ether, ethylene glycol ethyl ether, propylene glycol methyl ether, propylene glycol ethyl ether, dimethoxyethane or ethyl acetate. The reaction is preferably carried out under acidic catalysis, for example by small amounts of concentrated sulfuric acid, sulfanilic acid, p-toluenesulfonic acid and the like. The 4,4'-bis (hydroxyethylamino)diphenylmethane of the formula VII can be isolated in a conventional manner, if desired. Preferably, however, the solution obtained is directly used for the subsequent oxidation/condensation reaction to form the triarylmethane dye of the formula I. Useful oxidizing agents for this include, for example, manganese dioxide or chloranil.

A particularly preferred oxidizing agent is molecular oxygen in the form of oxygen gas or an oxygen-containing gas mixture, such as air in particular. The oxidation by means of oxygen is effected in the presence of an oxygen-activating heavy metal catalyst and of a redox mediator.

Solvents for the oxidation include the solvents mentioned above, among which particular preference is given to acetic acid, which also acts as anion source. When other solvents are used, it is advisable to add acetic acid or formic acid as anion source.

Useful redox mediators include compounds that can exist in an oxidized and a reduced form. The redox potential for the transition from the oxidized to the reduced form should preferably be in the range from 0 to 1.0 volt against the standard hydrogen electrode. Useful redox mediators include in particular benzoquinones and phenanthrenequinones. Preferred redox mediators are F-, Cl-, Br- or CN-substituted benzoquinones or $NO_2$-substituted phenanthrenequinones. Specific examples include tetrafluoro-1,4-benzoquinone, tetrachloro-1,4-benzoquinone, tetrabromo-1,4-benzoquinone, dichlorodicyano-1,4-benzoquinone or tetracyano-1,4-benzoquinone, 2-nitrophenanthrenequinone, 2,7-dinitrophenanthrenequinone or 4,5-dinitrophenanthrenequinone, tetrachloro-1,2-benzoquinone or tetrabromo-1,2-benzoquinone. Particular preference is given to using tetrachloro-1,4-benzoquinone or tetrabromo-1,4-benzoquinone. Quinones can be used as such or in the form of hydroquinones. The nitrophenanthrenequinones and also haloquinones can be used in pure form or in the form of as-synthesized mixtures.

The redox mediator is preferably used in an amount of from 0.1 to 15 mol %, especially from 1 to 10 mol %, based on the 4,4'-bis(hydroxyethylamino)diphenylmethane VII.

The oxygen-activating heavy metal catalyst comprises complexes of transition metals, preferably iron or cobalt with preferably multidentate ligands and preferably planar configuration. Particularly preferred ligands are tetraaza[14]annulenes or azomethines of 2-hydroxybenzaldehyde with diamines.

Preferred tetraazaannulene complexes have the following general structural formula:

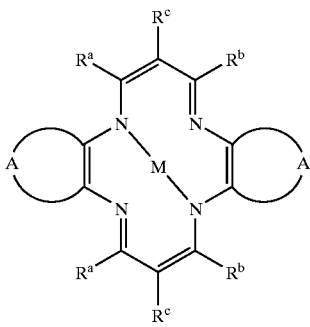

where M is Fe or Co, $R^a$ and $R^b$ are each hydrogen, $C_1$–$C_6$-alkyl or $C_6$–$C_{14}$-aryl, especially hydrogen, and A is in each case a bivalent radical which combines with the carbon atoms bearing the A radical to form an aromatic ring, for example a benzene ring, or a heterocyclic ring, for example a pyrrole ring. This ring may bear radicals, such as methyl and chlorine.

$R^c$ is hydrogen, $C_1$–$C_6$-alkyl, $C_1$–$C_6$-alkoxy, arylazo, hydroxyl, COOR' (where R'= for example $C_1$–$C_6$-alkyl, $C_6$–$C_{10}$-aryl or $C_7$–$C_{14}$-aralkyl), 4-pyridinyl or N-pyridinio.

Iron 5,14-dihydrodibenzo[b,i][1,4,8,11] tetraazacyclotetradecinate is most preferred.

A process for preparing triarylmethane dyes by catalytic oxidation that may analogously be used for preparing the dyes of the invention is described in DE-B-2 334 918 and also DE-C-2 152 703, which are both fully incorporated herein by reference.

The invention further provides a colorant preparation that includes at least one cationic triarylmethane dye of the formula I and a dyebase of the formula II and also a vehicle and optionally a binder and optionally further customary assistants, such as dispersants or thickeners. The colorant preparation can be used for example for dyeing paper fiber, as stamp ink, ink ribbons for printers and typewriters, especially thermal transfer ink ribbons or ink ribbons for typewriters or impact printers; printing ink, especially for intaglio printing, screen printing or offset printing, or recording fluids, especially paste inks for ballpoint pens.

Useful vehicles include inter alia oleophilic solvents such as oils, for example rapeseed oil, castor oil or soybean oil; fats, fatty acids, such as oleic acid; aromatic hydrocarbons, such as toluene, xylene, chlorobenzene; aliphatic hydrocarbons, such as petroleum ethers; alcohols, such as benzyl alcohol, propanol, isobutanol; ethers, such as tetrahydrofuran; halogenated hydrocarbons, such as methylene chloride; ketones, such as methyl ethyl ketone, cyclopentanone, cyclohexanone; glycols, glycol ethers or polyglycols.

Useful vehicles further include vehicles that are solid at room temperature, especially waxes, such as candelilla wax, carnauba wax, paraffins, or thermoplastic resins.

Useful binders include for example natural, modified or synthetic resins, cellulose esters, such as ethylcellulose, ethylhydroxyethylcellulose; polyvinyl butyrate, polyvinyl acetate, cellulose propionate and the like.

Useful dispersants include for example sorbitan fatty acid esters.

The triarylmethane dyes of the invention can also be blended with other dyes or pigments to obtain desired hues.

The colorant preparation can be applied to a filmlike support or the like to produce thermal transfer ink ribbons. To produce ink ribbons for typewriters and impact printers a textile support, for example a nylon tape, can be impregnated with the colorant preparation.

Triarylmethane dyes of the formula I are also useful for dyeing and shading paper in the pulp. To pulp dye, the dyes are generally in a liquid formulation when they are added to the aqueous fiber pulp in the course of papermaking.

The examples which follow illustrate the invention (all parts are by weight):

EXAMPLES

Example 1

To a mixture of 340 parts of N-hydroxyethyl-N-ethylaniline, 329 parts of acetic acid and 2 parts of sulfanilic acid 111 parts of a 30% formalin solution are added dropwise at from 40 to 70° C. with stirring. The reaction mixture is subsequently maintained at from 65 to 70° C. for a further hour. After the reaction solution has been cooled to 35° C. it is admixed with 325 parts of acetic acid, 231 parts of propylene glycol, 231 parts of N-phenyl-1-naphthylamine, 5 parts of chloranil and 9 parts of the Fe complex of dihydrodibenzotetraaza[14]annulene (water-moist; 47% strength) and the mixture is sparged with air at from 40 to 50° C. by intensive stirring. The solution is then clarified. This provides 1480 parts of a concentrated blue solution of the dye of the formula I where $R^1=R^2=$ethyl, $A^\ominus=$acetate. Maximum absorption at 610 nm in ethanol: 96%. The dye solution can be used directly or after dilution with water for pulp dyeing paper.

Example 2

To a solution of 1500 parts of water and 427 parts of a 50% aqueous sodium hydroxide solution are added dropwise with stirring 600 parts of the dye solution of Example 1 at from 50 to 70° C. A suspension is formed and is maintained at from 50 to 70° C. for 6 hours. The precipitated dyebase is filtered off and washed neutral with water. The yield after drying is 223 parts. The dyebase is useful for producing ballpoint pen pastes and for brightening toluene intaglio printing inks.

Example 3

165 parts of the dyebase of Example 2 are suspended in 728 parts of water and 38 parts of 32% hydrochloric acid are added at from 20 to 35° C. in the course of two hours with stirring. The suspension is maintained at from 30 to 40° C. for 6 hours. Filtration and drying affords 181 parts of the dye of the formula I ($R^1=R^2$=ethyl, $A^\ominus$=chloride). The dye is useful inter alia for producing solventborne inks.

Example 4

288 parts of the dyebase of Example 2 are dissolved in a solution of 400 g of phenylglycol, 100 g of benzyl alcohol and 170 g of oleic acid at from 50 to 70° C. with stirring to form a solution of the dye of the formula I ($R^1=R^2$=ethyl, $A^\ominus$=oleate) useful for producing ballpoint pen pastes and for brightening toluene intaglio printing inks. Instead of oleic acid it is also possible to use N-oleylsarcosine or a mixture of the mono-/di-2-ethylhexyl ester of phosphoric acid.

Example 5

A mixture of 311 parts of N-hydroxyethyl-N-methylaniline, 680 parts of acetic acid, 33 parts of paraformaldehyde and 2 parts of sulfanilic acid is heated to 40° C. with stirring. The condensation which starts increases the temperature to 65 to 70° C. The reaction mixture is subsequently maintained at from 65 to 70° C. for a further hour. After the reaction mixture has been cooled to 35° C. it is admixed with 224 parts of propylene glycol, 231 parts of N-phenyl-1-naphthylamine, 5 parts of chloranil and 9 parts of the Fe complex of dihydrodibenzotetraaza[14]annulene (water-moist; 47% strength) and the mixture is sparged with air at from 40 to 50° C. by intensive stirring. This provides 751 parts of a concentrated blue solution of the dye of the formula I where $R^1=R^2$=ethyl, $A^\ominus$=acetate. Maximum absorption at 604 nm in ethanol: 96%. The dye solution can be used directly for pulp dyeing paper.

Example 6

32.8 g (0.15 mol) of N-phenyl-1-naphthylamine and 56.1 g (0.15 mol) of 4,4'-bis[di-(2-hydroxyethyl)-amino] diphenylmethane were dissolved in 150 g of acetic acid and 30 g of 1,2-propanediol at 100° C. After cooling the solution to 44–46° C. 1.5 g of chloranil and 1.5 g of iron 5,14-dihydrodibenzo[b,i]-[5,9,14,18]tetraaza[14]annulene were added. The mixture was subsequently sparged with oxygen until 3.4 l had been taken up. The deep blue solution was cooled down to room temperature and clarified. 270 g of dye solution were obtained.

What is claimed is:

1. A process for preparing a triarylmethane dye of the formula I or II:

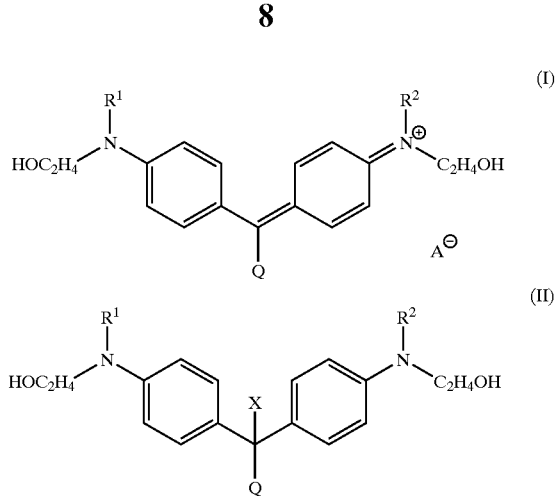

where $R^1$ and $R^2$ are independently methyl, ethyl or hydroxyethyl,

Q is a radical of the formula III or IV:

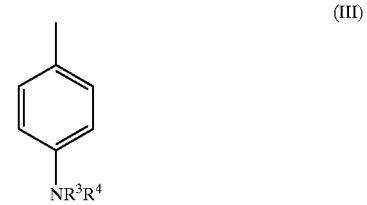

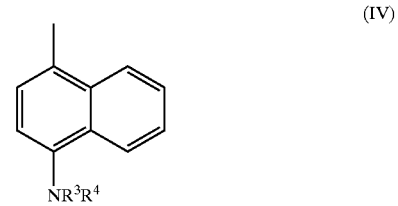

$R^3$ and $R^4$ are independently hydrogen, methyl, ethyl or phenyl, $A^\ominus$ is the equivalent of an anion of an inorganic or organic acid, and X is hydroxyl or amino, which comprises reacting an N-hydroxyethylaniline of the formula VI:

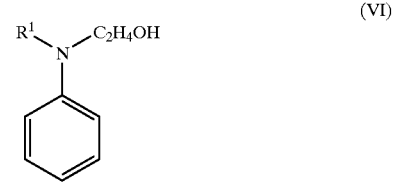

with formaldehyde to form a 4,4'-bis(hydroxyethylamino)diphenylmethane of the formula VII:

(VII)

and treating the 4,4'-bis(hydroxyethylamino) diphenylmethane VII with an oxidizing agent in the presence of an aminoaromatic of the formula VIII or IX:

(VIII)

(IX)

and of an anion source to obtain a triarylmethane dye of the formula I which is optionally converted with an alkali metal hydroxide or ammonia into a triarylmethane dye of the formula II.

2. The process of claim 1, where Q is a radical of the formula V (V)

3. The process of claim 1, wherein the oxidizing agent is molecular oxygen and the treating is effected in the presence of an oxygen-activating heavy metal catalyst and of a redox mediator.

4. A triarylmethane dye of the formula Ia or IIa where
$R^1$ and $R^2$ are the same and are each methyl, ethyl or hydroxyethyl,
Q is (V)

$A^\ominus$ is the equivalent of an anion of an inorganic or organic acid, and
X is hydroxyl or amino.

5. A colorant preparation comprising:
at least one triarylmethane dye of claim 4 and at least one vehicle.

6. A method for dyeing paper fiber or for producing an ink ribbon comprising applying the triarylmethane dye of claim 4 to paper fiber or to an ink ribbon.

7. A method for producing stamp pad inks, printing inks or recording fluids comprising:
admixing the triarylmethane dye of claim 4 with a suitable vehicle, and optionally, with a suitable binder, dispersant and/or thickener.

8. The process of claim 1, comprising recovering a triarylmethane dye of formula (I).

9. The process of claim 1, comprising converting the triarylmethane dye of the formula (I) with an alkali metal hydroxide or ammonia into a triarylmethane dye of the formula (II) and recovering said tirarylmethane dye of formula (II).

10. The process of claim 1, wherein $R^1$ and/or $R^2$ is methyl.

11. The process of claim 1, wherein $R^1$ and/or $R^2$ is ethyl.

12. The process of claim 1, wherein $R^1$ and/or $R^2$ is hydroxyethyl.

13. The process of claim 1, wherein Q is a radical of formula (III).

14. The process of claim 1, wherein Q is a radical of formula (IV).

15. The process of claim 1, wherein $R^3$ and/or $R^4$ is hydrogen.

16. The process of claim 1, wherein $R^3$ and/or $R^4$ is methyl.

17. The process of claim 1, wherein $R^3$ and/or $R^4$ is ethyl.

18. The process of claim 1, wherein $R^3$ and/or $R^4$ is phenyl.

19. The process of claim 1, wherein X is hydroxyl.

20. The process of claim 1, wherein X is amino.

21. A dyed paper fiber, an ink ribbon, a ballpoint pen, an ink stamp or a recording fluid comprising the triarylmethane dye of claim 4.

22. The process of claim 1, wherein the oxidizing agent comprises molecular oxygen.

23. The process of claim 1, wherein the oxidizing agent comprises hydrogen peroxide, a hydrogen peroxide donor compound, an organic hydroperoxide, or a percarboxylic acid.

24. The process of claim 1, wherein said treating the 4,4'-bis(hydroxyethylamino)diphenylmethane VII with an oxidizing agent is conducted in a solvent comprising acetic acid or formic acid.

25. The process of claim 1, wherein said treating the 4,4'-bis(hydroxyethylamino)diphenylmethane VII with an oxidizing agent is conducted in the presence of at least one redox mediator selected from the group consisting of benzoquinone and phenathrenequinone.

26. The process of claim 1, wherein said treating the 4,4'-bis(hydroxyethylamino)diphenylmethane VII with an oxidizing agent is conducted in the presence of at least one oxygen-activating heavy metal catalyst.

27. The process of claim 1, wherein said treating the 4,4'-bis(hydroxyethylamino)diphenylmethane VII with an oxidizing agent is conducted in the presence of at least one oxygen-activating heavy metal catalyst selected from the group consisting of an oxygen-activating iron catalyst and an oxygen-activating cobalt catalyst.

* * * * *